United States Patent [19]

Lansberry

[11] Patent Number: 5,694,017
[45] Date of Patent: Dec. 2, 1997

[54] TIME DELAY COMPRESSED SYNCHRONOUS FRAME CONTROLLER

[75] Inventor: Geoffrey B. Lansberry, Cambridge, Mass.

[73] Assignee: Chrysler Corporation, Auburn Hills, Mich.

[21] Appl. No.: 642,132

[22] Filed: May 2, 1996

[51] Int. Cl.[6] ........................................................ H02P 5/28
[52] U.S. Cl. ........................ 318/809; 318/799; 318/802; 180/65.8
[58] Field of Search ........................ 318/727, 767, 318/772, 798–812; 180/54.1, 65.1–65.8

[56] References Cited

U.S. PATENT DOCUMENTS

| | | | |
|---|---|---|---|
| 3,723,718 | 3/1973 | Jaffe et al. | 235/185 |
| 4,444,285 | 4/1984 | Stewart et al. | 180/65.4 |
| 4,495,451 | 1/1985 | Barnard | 318/150 |
| 4,533,011 | 8/1985 | Heidemeyer et al. | 180/65.2 |
| 4,631,456 | 12/1986 | Drescher et al. | 318/140 |
| 4,900,962 | 2/1990 | Hockney et al. | 310/90.5 |
| 4,961,352 | 10/1990 | Downer et al. | 74/5.46 |
| 5,057,759 | 10/1991 | Ueda et al. | 318/800 |
| 5,172,784 | 12/1992 | Varela, Jr. | 180/65.4 |
| 5,255,733 | 10/1993 | King | 180/65.3 |
| 5,291,975 | 3/1994 | Johnson et al. | 188/378 |
| 5,318,142 | 6/1994 | Bates et al. | 180/65.2 |
| 5,319,273 | 6/1994 | Hockney et al. | 318/632 |
| 5,327,987 | 7/1994 | Abdelmalek | 180/65.2 |
| 5,345,761 | 9/1994 | King et al. | 180/65.3 |
| 5,353,656 | 10/1994 | Hawkey et al. | 74/5.41 |
| 5,396,140 | 3/1995 | Goldie et al. | 310/268 |
| 5,415,245 | 5/1995 | Hammond | 180/165 |
| 5,442,288 | 8/1995 | Fenn et al. | 324/244 |
| 5,465,015 | 11/1995 | Anastas et al. | 310/26 |
| 5,541,488 | 7/1996 | Bansal et al. | 318/807 |
| 5,559,419 | 9/1996 | Jansen et al. | 318/807 |

OTHER PUBLICATIONS

Popular Science Magazine, Emerging Technologies for the Supercar, Jun. 1994.
NASA Tech Briefs, The Digest of New Technology, Jun. 1995, vol. 19, No. 6, pp. 12 and 13.

*Primary Examiner*—Davis S. Martin
*Attorney, Agent, or Firm*—Mark P. Calcaterra

[57] ABSTRACT

A time delay compensated synchronous reference frame controller for a drive motor having a rotor and using an alternating current having a phase angle includes a low pass filter electrically connected to the drive motor for eliminating high frequency components of the alternating current, a coordinate transformer electrically connected to the low pass filter for receiving the alternating current and for defining a moving reference frame based on the phase of the alternating current, a controller electrically connected to the coordinate transformer for driving the alternating current to a proper phase relative to a flux of the rotor of the motor, an inverse coordinate transformer electrically connected to the compensator for receiving the alternating current and for transforming the moving reference frame to a stationary reference frame, and a reference frame shifter operatively connected to this coordinate transformer and the inverse coordinate transformer wherein the reference frame shifter defines a shift in the moving reference frame based on time delays created by the low pass filter and the controller.

10 Claims, 2 Drawing Sheets

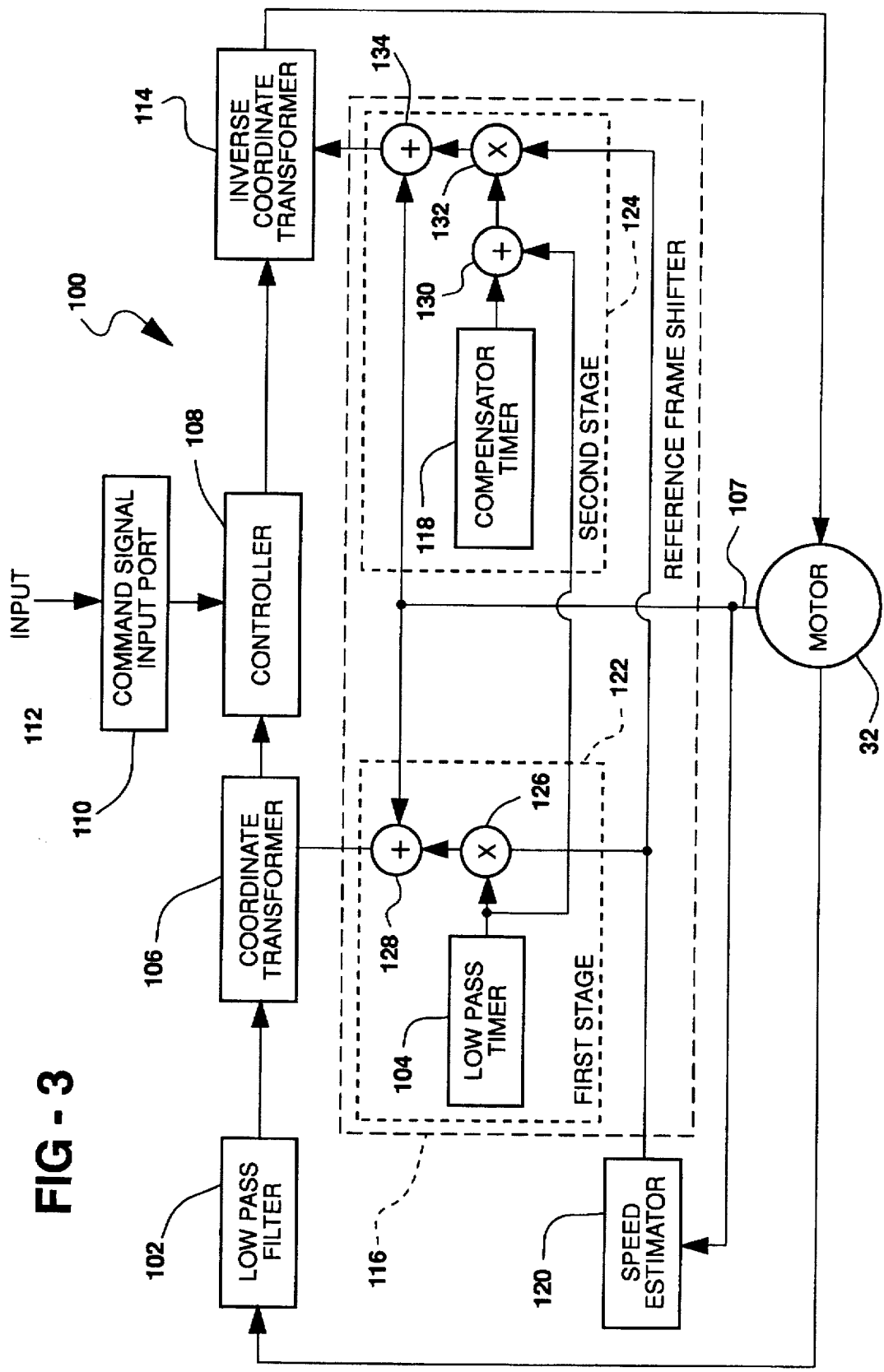

TIME DELAY COMPRESSED SYNCHRONOUS FRAME CONTROLLER

BACKGROUND OF THE INVENTION

1. Field of the Invention

The present invention relates generally to powertrain systems in vehicles, and, more particularly, to a hybrid powertrain system in an automotive vehicle.

2. Description of the Related Art

Since the invention of power vehicles, many different powertrain systems have been attempted, including a steam engine with a boiler or an electric motor with a storage battery. It was, however, the four-stroke internal combustion engine invented by Otto in 1876, and the discovery of petroleum in 1856 that provided the impetus for the modern automotive industry.

Although gasoline emerged as the fuel of choice for automotive vehicles, recent concerns regarding fuel availability and increasingly stringent federal and state emission regulations have renewed interest in alternative fuel powered vehicles. For example, alternative fuel vehicles may be powered by methanol, ethanol, natural gas, electricity or a combination of fuels.

A dedicated electric powered vehicle offers several advantages: electricity is readily available; an electric power distribution system is already in place; and an electric powered vehicle produces virtually zero emissions. There are several technological disadvantages that must be overcome before electric powered vehicles gain acceptance in the marketplace. For instance, the range of an electric powered vehicle is limited to approximately 100 miles, compared to about 300 miles for a gasoline powered vehicle. Further, the acceleration is about half that of a similar gasoline power vehicle. There is, therefore, a need in the art for a powertrain to provide an electric motor for an automotive vehicle which capable of performing as dynamically as an internal combustion engine.

SUMMARY OF THE INVENTION

It is, therefore, one object of the present invention to provide an electric motor for an automotive vehicle.

It is another object of the present invention to provide a drive motor.

It is yet another object of the present invention to provide a compensator for the drive motor such that the drive motor may always be accurately time delay compensated synchronous reference frame controlled.

According to the foregoing objects, the present invention is a time delay compensated synchronous reference frame controller for a drive motor using an alternating current having a phase angle. The time delay compensated synchronous reference frame controller includes a low pass filter electrically connected to the drive motor for eliminating high frequency components of the alternating current. The time delay compensated synchronous reference frame controller also includes a coordinate transformer electrically connected to the low pass filter for receiving the alternating current and for defining a moving reference frame based on the phase of the alternating current. The time delay compensated synchronous reference frame controller further includes a controller electrically connected to the coordinate transformer for controlling the alternating current based on, in part, the time delays created by input conditioning elements. An inverse coordinate transformer is electrically connected to the controller and receives the output of the controller. The inverse coordinate transformer transforms the moving reference frame to a stationary reference frame. A reference frame shifter is operatively connected to coordinate transformer and the inverse coordinate transformer. The reference frame shifter defines a shift in the moving reference frame based on the time delays created by the low pass filter and the controller. One advantage associated with the present invention is the ability to properly orient the controller for a drive motor utilizing one of the currents output from the coordinate transformer which is aligned with the rotor flux by identifying and compensating for any delays created by processing elements. Yet another advantage associated the present invention is the ability to synchronize the drive motor accurately using slow and low cost componentry because of the ability to compensate for their time delays.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3 is a block diagram of one embodiment of the time delay compensated synchronous reference frame controller.

DESCRIPTION OF THE PREFERRED EMBODIMENT(S)

Figure 1:
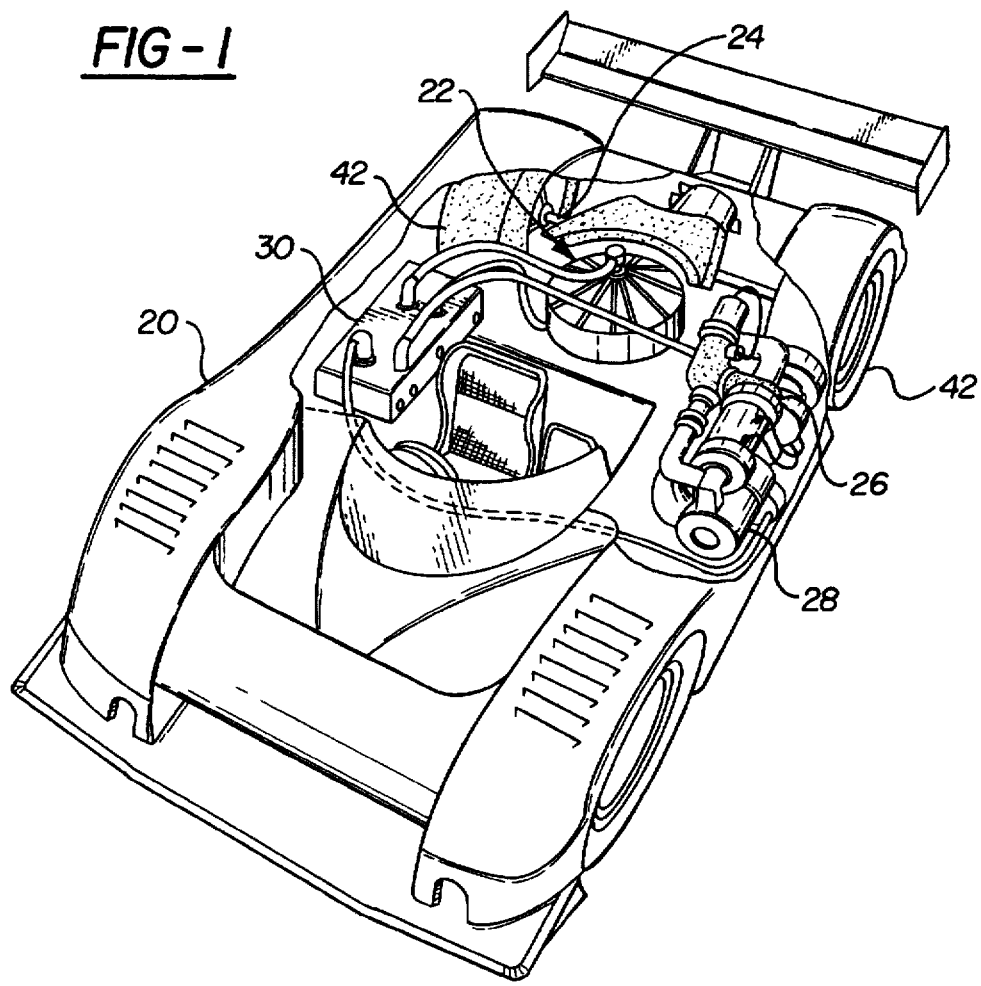
FIG. 1 is a perspective view partially cut away of an automotive vehicle.
Figure 2:
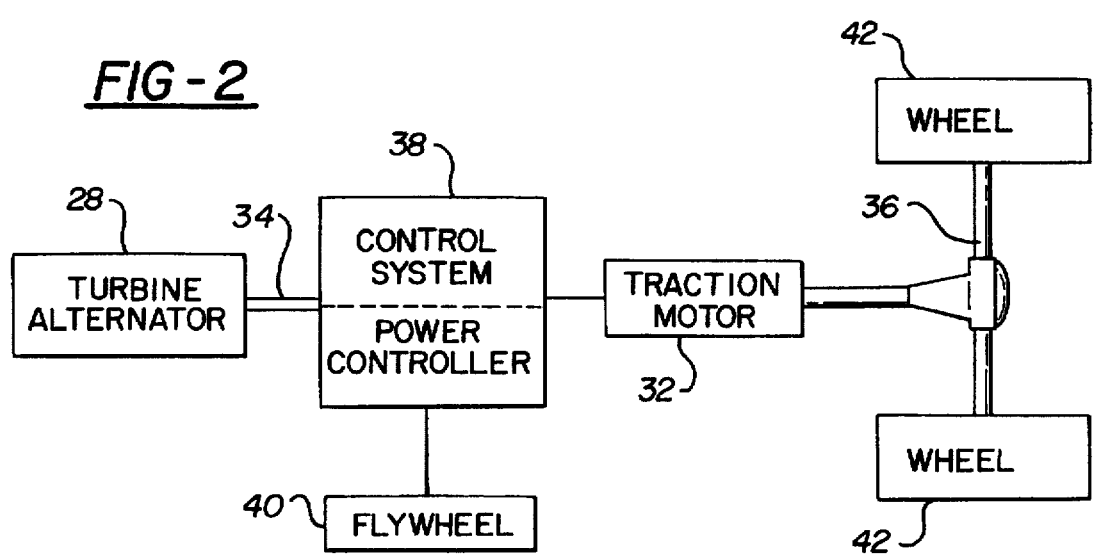
FIG. 2 is a block diagram of the power train for the automotive vehicle.

Referring to FIGS. 1 and 2, a hybrid powertrain system is illustrated for an automotive vehicle 20. The vehicle 20 is partially shown in a cut away view illustrating a hybrid powertrain system 22 disposed within the chassis 24. The hybrid powertrain system 22 includes a gas powered turbine engine 26, which in this example is fueled by liquefied natural gas. The turbine engine 26 spins an alternator 28 to generate electric power. It should be appreciated that in this example there are two alternators 28 that run at different speeds, such as 60,000 rpm and 100,000 rpm, to produce electricity equivalent to 500 horsepower. It should be appreciated that the turbine engine 26 and the alternator may be referred to as a turboalternator.

A power or vehicle management controller 30 is in communication with the turbine engine 26 and alternator 28, and manages the distribution of power from the alternator 28 to a traction motor 32 using a power transfer mechanism 34, utilizing an AC to DC inverter. In this example the traction motor 32 is an AC induction traction motor 32. The motor 32 transfers its energy to the drive train 36 to drive the automotive vehicle 20.

Therefore, a signal from the vehicle management controller 30 directs the alternator 28 to supply power to the traction motor 32 and eventually to wheels 42. If the net power between the turboalternator 28 and the traction motor 32 is nonzero, the flywheel 40 makes up the difference.

Preferably, the hybrid powertrain system 22 also includes various critically placed sensors which are conventional and well known in the art. The outputs of these sensors communicate with the vehicle management controller 30. It should also be appreciated that the automotive vehicle 20 includes other hardware not shown, but conventional in the art to cooperate with the hybrid powertrain system 20.

Because of the high frequencies of the traction motor 32, compensation for signal time delays must occur for proper operation. A time delay compensated synchronous reference frame controller for the traction motor (drive motor) 32 is generally indicated at 100 in FIG. 3 and hereinafter referred to as the "SRF controller." The SRF controller synchronous reference frame controller 100 controls the torque of the traction motor 32 by varying the magnitude and phase of the current. The time delay compensator 100 includes a low pass filter 102. The low pass filter 102 is electrically connected to the drive motor 32. The low pass filter 102 eliminates high frequency components of the VFAC, if any are present, and reduces the noise in the system. The low pass filter 102 also prevents aliasing in a sampled system. The introduction of the low pass filter 102 into the system creates a time delay which is substantially constant. This constant time delay is stored in the low pass filter delay 104, discussed subsequently.

A coordinate transformer 106 is electrically connected to the low pass filter 102. The coordinate transformer receives the VFAC and maps it onto a moving reference frame based on a position signal output at a junction 107 from the motor 32. The coordinate transformer 106 transforms the reference frame, in part, by multiplying the currents by a factor, $e^{j\Theta}$. Once the currents have been transformed into a moving reference frame, conditioning as well as information retrieval systems become less complicated because the moving reference shifts AC quantities down such that the fundamental frequency of the VFAC becomes DC.

A controller 108 is electrically connected to the coordinate transformer 106. The controller 108 drives the alternating current to the proper phase relative to the rotor flux of the motor 32. The controller 108 may introduce a constant or, in the alternative, it may introduce a function based on the input and/or the type of command signal input port 110 used.

Electrically connected to the controller 108 is an inverse coordinate transformer 114. The inverse coordinate transformer 114 receives the output from the controller 108 and transforms the moving reference frame quantities back to stationary reference frame quantities. Because the drive motor 32 cannot use the inputs in the transformed state, the inverse coordinate transformer 114 must transform the reference back to a stationary point. In the example described above, the inverse coordinate transformer 114 would multiply the controller outputs by $e^{-j\Theta}$.

A reference frame shifter 116 is operatively connected to the coordinate transformer 106, the inverse coordinate transformer 114, speed estimator 120 and the drive motor 32. The reference frame shifter 116 defines a shift in the moving reference frame based on time delays created by the low pass filter 102 and the compensator 108. The compensator delay is stored at 118. In one embodiment, the low pass filter delay 104 and the compensator delay 118 are constants and stored in a memory device. In an alternative embodiment, the low pass filter delay 104 and the compensator delay 118 are measuring devices which constantly measure the delays created by the low pass filter 102 and the compensator 108, respectively.

A speed estimator 120 is electrically connected between the drive motor 32 and the reference frame shifter 116. The speed estimator 120 calculates the mechanical speed based upon encoder information. The speed estimator 120 can be any one of several types of speed estimators as are well known in the art.

The reference frame shifter 116 includes a first stage 122 and a second stage 124. The first stage 122 of the reference frame shifter 116 is used to shift the reference frame of the coordinate transformer 106 such that its output is compensated for the delays created by the low pass filter 102. The first stage 122 includes the low pass filter delay 104. The output of the speed estimator 120 is multiplied by the output of the low pass filter delay 104 to create a phase displacement. This displacement is then added to the actual displacement of the drive motor 32. More specifically, the first stage 122 includes the first multiplier 126 which multiplies the output of the low pass filter delay 104 and the output of the speed estimator 120. A first adder 128 adds the output 107 of the drive motor 32 and the output of the first multiplier 126. This phase shift is then input into the coordinate transformer 106. The second stage 124 of the reference frame shifter 116 receives inputs from the compensator delay 118, the low pass filter delay 104, and the speed estimator 120. The outputs of the compensator delay 118 and the low pass filter delay 104 are added by a second adder 130. From there the output of the second adder 130 is multiplied by a second multiplier 132 with the output of the speed estimator 120. The resulting multiplication is a phase shift which is added to the output of the drive motor 32 by a third adder 134. The resulting output of the third adder 134 is input into the inverse coordinate transformer 114. From the shifted reference frames, the drive motor currents and, therefore, torque can be precisely controlled to the input received from the input port 110.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A time delay compensated synchronous reference frame controller for a drive motor having a rotor and using an alternating current having a defined phase angle, said time delay compensated synchronous frame controller comprising:

a low pass filter electrically connected to the drive motor for eliminating high frequency components of the alternating currents;

a coordinate transformer electrically connected to said low pass filter for receiving the alternating current and for defining a moving reference frame based on the phase of the alternating current;

a controller electrically connected to said coordinate transformer for driving the alternating current to a proper phase relative to a flux of the rotor of the motor;

an inverse coordinate transformer electrically connected to said controller for receiving the controller outputs and for transforming the controller outputs to a stationary reference frame; and a reference frame shifter operatively connected to said coordinate transformer and said inverse coordinate transformer, said reference frame shifter defining a shift in said moving reference frame based on time delays created by a said low pass filter and said controller.

2. A reference frame controller as set forth in claim 1 including a speed estimator electrically connected between the drive motor and said reference frame shifter.

3. A reference frame controller as set forth in claim 1 wherein said reference frame shifter includes a first stage and a second stage.

4. A reference frame controller as set forth in claim 3 wherein said first stage includes a low pass filter delay to define a delay in time from said low pass filter.

5. A reference frame controller as set forth in claim 4 wherein said first stage includes a first multiplier to multiply an output from said low pass filter delay and an output from said speed estimator.

6. A reference frame controller as set forth in claim 5 wherein said first stage includes a first adder to add an output from the drive motor and an output from said first multiplier.

7. A reference frame controller as set forth in claim 3 wherein said second stage includes a compensator delay to define a delay in time from said compensator.

8. A reference frame controller as set forth in claim 7 wherein said second stage includes a second adder to add the output from said low pass filter delay and an output from said compensator delay to create an added delay signal.

9. A reference frame controller as set forth in claim 8 wherein said second stage includes a second multiplier to multiply the output from said speed estimator and the added delay signal.

10. A reference frame controller as set forth in claim 9 wherein said second stage includes a third adder to add the output of the drive motor and the output from said second multiplier.

* * * * *